(12) United States Patent
Nakahara et al.

(10) Patent No.: US 10,404,125 B2
(45) Date of Patent: Sep. 3, 2019

(54) MOTOR

(71) Applicant: Nidec Corporation, Kyoto (JP)

(72) Inventors: Yasuaki Nakahara, Kyoto (JP); Takayuki Migita, Kyoto (JP); Hisashi Fujihara, Kyoto (JP); Tsuyoshi Nakamura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/145,317

(22) Filed: Sep. 28, 2018

(65) Prior Publication Data
US 2019/0036406 A1    Jan. 31, 2019

Related U.S. Application Data

(63) Continuation of application No. PCT/JP2017/004321, filed on Feb. 7, 2017.

(30) Foreign Application Priority Data

Mar. 30, 2016 (JP) ................. 2016-068485

(51) Int. Cl.
*H02K 3/04* (2006.01)
*H02K 3/28* (2006.01)
(Continued)

(52) U.S. Cl.
CPC ............... *H02K 3/28* (2013.01); *H02K 1/146* (2013.01); *H02K 3/04* (2013.01); *H02K 3/18* (2013.01);
(Continued)

(58) Field of Classification Search
CPC .. H02K 3/04; H02K 3/28; H02K 3/18; H02K 3/325; H02K 3/52; H02K 3/522; H02K 2203/09; H02K 2213/03
(Continued)

(56) References Cited

U.S. PATENT DOCUMENTS 4,338,534 A * 7/1982 Broadway ............... H02K 17/14
    310/184
6,333,578 B1 * 12/2001 Nakamura ............ H02K 17/14
    310/166

(Continued)

FOREIGN PATENT DOCUMENTS

| JP | 6-343236 A | 12/1994 |
| JP | 2007-244008 A | 9/2007 |
| JP | 2015-211587 A | 11/2015 |

OTHER PUBLICATIONS

Official Communication issued in International Patent Application No. PCT/JP2017/004321, dated Apr. 25, 2017.

*Primary Examiner* — Thanh Lam
(74) *Attorney, Agent, or Firm* — Keating & Bennett, LLP

(57) ABSTRACT

A stator includes conductive wires wound around teeth, and slots between adjacent teeth in a circumferential direction. The conductive wires include conductive wires of three phases corresponding to a U-phase, a V-phase, and a W-phase, and the conductive wires are delta connected. Coils, in which any one of the conductive wires is wound around the teeth, are repeatedly disposed in order of the U-phase, the V-phase, and the W-phase in the circumferential direction. In each of the U-phase, the V-phase, and the W-phase, at least two coils are connected in series and adjacent in the circumferential direction. A direction in which the U-phase and W-phase conductive wires are wound around the teeth and a direction in which the V-phase conductive wire is wound around the tooth are opposite.

20 Claims, 12 Drawing Sheets

(51) Int. Cl.
  *H02K 3/18* (2006.01)
  *H02K 3/52* (2006.01)
  *H02K 1/14* (2006.01)
  *H02K 3/32* (2006.01)

(52) U.S. Cl.
  CPC .............. *H02K 3/325* (2013.01); *H02K 3/52* (2013.01); *H02K 3/522* (2013.01); *H02K 2203/09* (2013.01); *H02K 2213/03* (2013.01)

(58) Field of Classification Search
  USPC .................... 310/179–180, 184–185, 208
  See application file for complete search history.

(56) References Cited

U.S. PATENT DOCUMENTS

| | | | |
|---|---|---|---|
| 2006/0138883 A1* | 6/2006 | Yagai | ..................... H02K 3/522 |
| | | | 310/71 |
| 2007/0205678 A1 | 9/2007 | Takashima et al. | |
| 2010/0320863 A1* | 12/2010 | Nishimura | ............... H02K 3/28 |
| | | | 310/198 |
| 2015/0311760 A1 | 10/2015 | Iwasaki | |
| 2017/0207673 A1* | 7/2017 | Kinjo | ..................... H02K 1/146 |
| 2018/0248433 A1* | 8/2018 | Okazaki | ................. H02K 21/16 |

* cited by examiner

MOTOR

CROSS REFERENCE TO RELATED APPLICATIONS

This application claims the benefit of priority to Japanese Patent Application No. 2016-068485 filed on Mar. 30, 2016 and is a Continuation Application of PCT Application No. PCT/JP2017/004321 filed on Feb. 7, 2017. The entire contents of each application are hereby incorporated herein by reference.

BACKGROUND OF THE INVENTION

1. Field of the Invention

The present disclosure relates to a motor.

2. Description of the Related Art

Conventionally, three-phase motors in which three phase coils including U-phase, V-phase, and W-phase coils are delta connected have been known. The conventional delta connected three-phase motor includes a stator with an annular shape. The stator includes a plurality of teeth spaced apart from each other in a circumferential direction. Any one of the conductive wires of three phases is wound around one tooth and a plurality of coils are provided. The plurality of coils are repeatedly and sequentially disposed in order of a U-phase coil, a V-phase coil, and a W-phase coil in the circumferential direction. In the U-phase, V-phase, and W-phase coils, winding directions of the conductive wires around the teeth are the same. The plurality of coils of each phase are connected in series. Since the coils of each phase are connected in series as one conductive wire, a start or last end of the wound coil is withdrawn as a drawing line. A drawing line of the coil of each of phases is connected to a drawing line of another phase to build delta connection. In a motor having such a configuration, a distance between ends of the drawing lines which are connected may be far. When the ends of the drawing lines are far away from each other, for example, surrounding wires or a busbar structure becomes complex, and thus a manufacturing cost increases.

SUMMARY OF THE INVENTION

According to a preferred embodiment of the present disclosure, a motor includes a stator having an annular shape around a central axis and including a rotor which is rotatable with respect to the stator. The stator includes a stator core, which includes a plurality of teeth disposed to face the rotor and spaced apart from each other in a circumferential direction, and conductive wires wound around the plurality of teeth. A total number of slots positioned between the adjacent teeth in the circumferential direction is six or more. A ratio of a total number of poles of the rotor to the total number of the slots is 2:3. The conductive wires include conductive wires of three phases corresponding to a U-phase, a V-phase, and a W-phase. The conductive wires of the three phases are delta connected. A plurality of coils, in which any one of the conductive wires of the three phases is wound around the teeth, are repeatedly disposed in order of the U-phase, the V-phase, and the W-phase in the circumferential direction. In each of the U-phase, the V-phase, and the W-phase, at least two coils are connected in series, and the coils connected in series are adjacent in the circumferential direction. A direction in which the U-phase and W-phase conductive wires are wound around the teeth and a direction in which the V-phase conductive wire is wound around the tooth are opposite. Ends of the conductive wires of the three phases are drawing lines withdrawn from one side in an axial direction.

According to a preferred embodiment of the present disclosure, a motor includes a stator including an annular shape around a central axis; and a rotor which is rotatable with respect to the stator, the stator includes a stator core, which includes a plurality of teeth disposed to face the rotor and spaced by a distance from each other in a circumferential direction, and conductive wires wound around the plurality of teeth, the conductive wires include conductive wires of three phases corresponding to a U-phase, a V-phase, and a W-phase, the conductive wires of the three phases are delta connected, a plurality of coils, in which any one of the conductive wires of the three phases is wound around the teeth, are repeatedly disposed in order of the U-phase, the V-phase, and the W-phase in the circumferential direction, in each of the U-phase, the V-phase, and the W-phase, at least two coils are connected in series and the coils connected in series are adjacent in the circumferential direction, a direction in which the U-phase and W-phase conductive wires are wound around the teeth and a direction in which the V-phase conductive wire is wound around the tooth are opposite, and ends of the conductive wires of the three phases are drawing lines withdrawn from one side in an axial direction.

According to a preferred embodiment of the present disclosure, a stator includes an annular shape around a central axis; and a stator core, which has an annular shape around a central axis, a plurality of teeth spaced at a distance from each other in a circumferential direction, and conductive wires wound around the plurality of teeth, wherein the conductive wires include conductive wires of three phases corresponding to a U-phase, a V-phase, and a W-phase, the conductive wires of the three phases are delta connected, a plurality of coils, in which any one of the conductive wires of the three phases is wound around the teeth, are repeatedly disposed in order of the U-phase, the V-phase, and the W-phase in the circumferential direction, in each of the U-phase, the V-phase, and the W-phase, at least two coils are connected in series and the coils connected in series are adjacent in the circumferential direction, a direction in which the U-phase and W-phase conductive wires are wound around the teeth and a direction in which the V-phase conductive wire is wound around the tooth are opposite, and ends of the conductive wires of the three phases are drawing lines withdrawn from one side in an axial direction.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Figure 1:
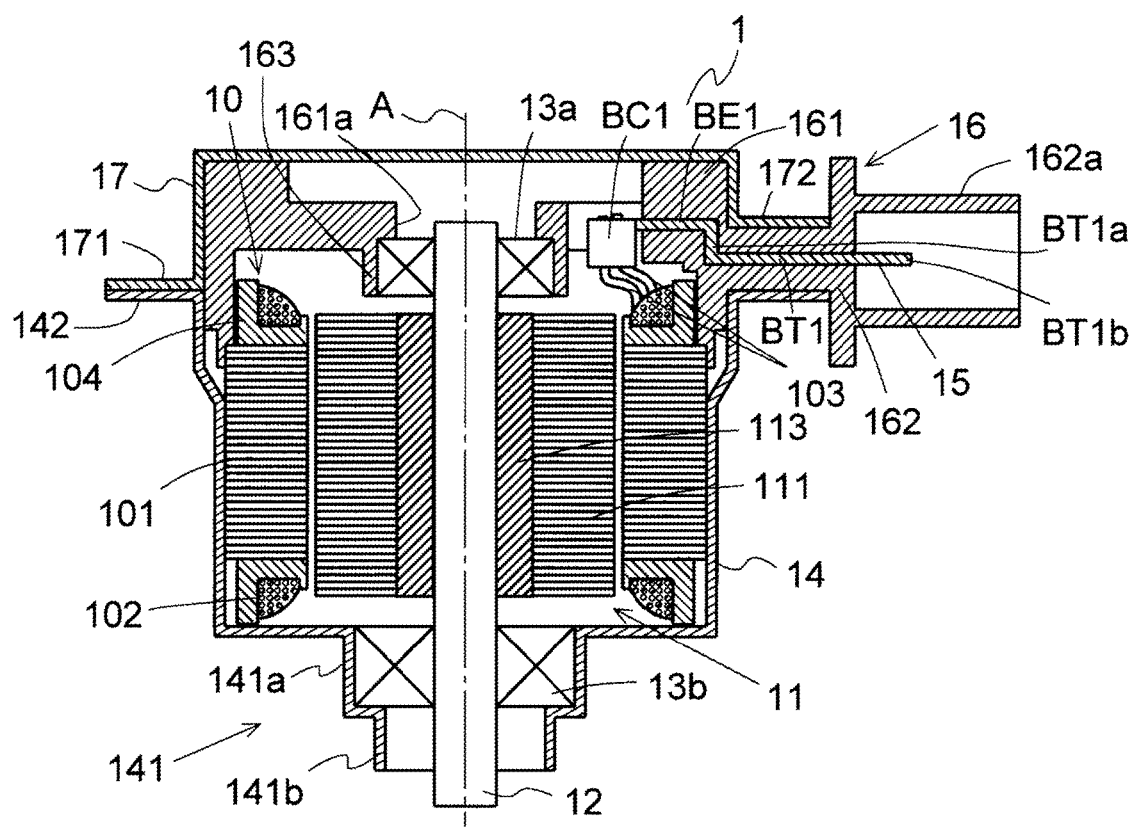
FIG. 1 is a schematic longitudinal-sectional view illustrating a motor according to a first preferred embodiment of the present disclosure.
Figure 7:
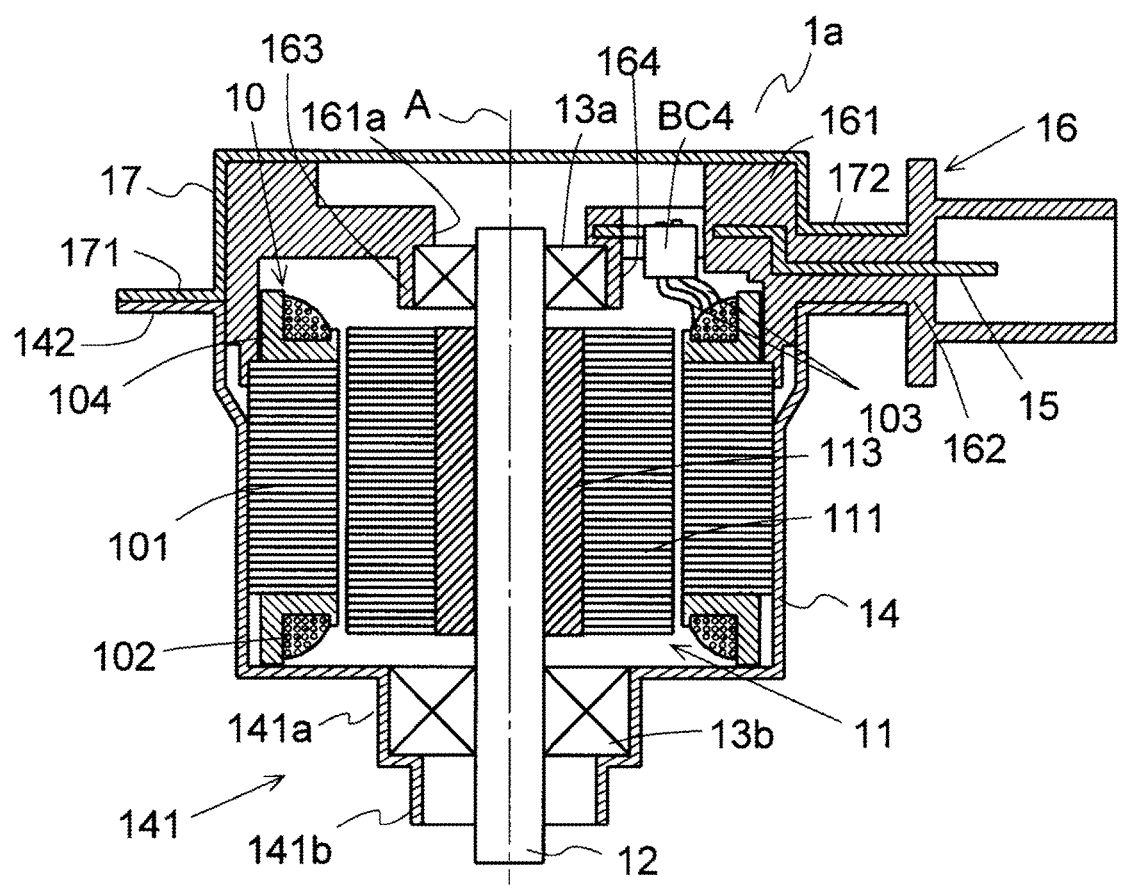
FIG. 7 is a schematic longitudinal-sectional view illustrating a motor according to a second preferred embodiment of the present disclosure.
Figure 9:
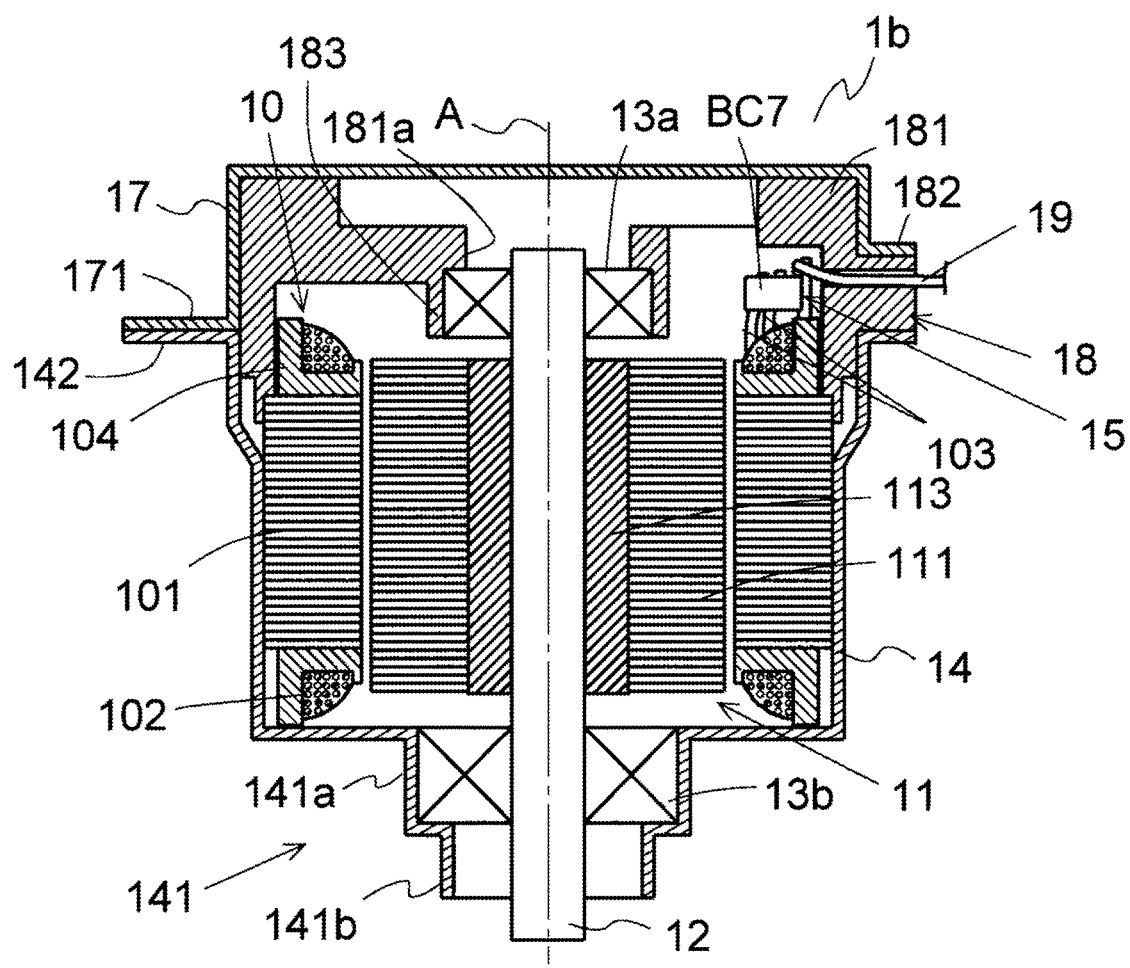
FIG. 9 is a schematic longitudinal-sectional view illustrating a motor according to a third preferred embodiment of the present disclosure.

Hereinafter, motors according to preferred embodiments of the present disclosure will be described in detail with reference to the accompanying drawings. In following description, a direction in which a central axis A of a motor extends as illustrated in FIGS. 1, 7, and 9 is simply referred to as an "axial direction," and a diameter direction of the central axis A of the motor and a circumferential direction about the central axis A of the motor are respectively simply referred to as a "diameter direction" and a "circumferential direction." In the following description, a direction parallel to the central axis A is referred to as a vertical direction in a case in which the motor is disposed in a direction as illustrated in FIGS. 1, 7, and 9. In this specification, one side in the axial direction is an upper side. In addition, the vertical direction is a term used only for description and does not limit an actual positional relationship or a direction.

FIG. 1 is a schematic longitudinal-sectional view illustrating a motor 1 according to a first preferred embodiment of the present disclosure. The motor 1 is preferably a three-phase motor. The motor 1 includes a stator 10 disposed in an annular or substantially annular shape about a central axis A. The motor 1 includes a rotor 11. The rotor 11 includes a rotor magnet and is rotatable with respect to the stator 10. The motor 1 is an inner rotor type motor in which the rotor 11 is disposed inside the stator 10 in a diameter direction.

Figure 2:
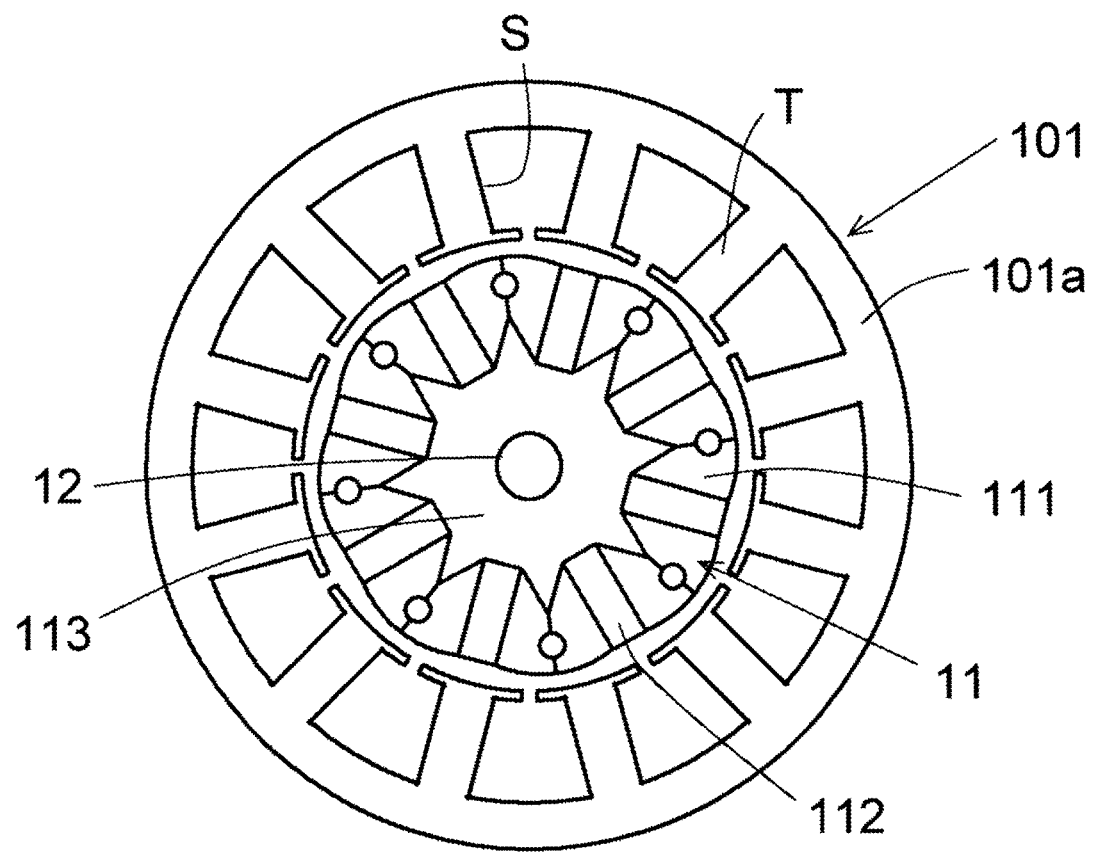
FIG. 2 is a schematic plan view illustrating a rotor and a stator core included in the motor according to the first preferred embodiment of the present disclosure.

FIG. 2 is a schematic plan view illustrating the rotor 11 and a stator core 101 included in the motor 1 according to the first preferred embodiment of the present disclosure. The rotor 11 preferably includes a shaft 12 extending along the central axis A and having a cylindrical or substantially cylindrical shape, a rotor core 111 defined by stacking a plurality of magnetic steel plates, a plurality of rotor magnets 112 having a plate or substantially plate shape, and a resin portion 113 arranged between the shaft 12 and the rotor core 111. The plurality of rotor magnets 112 are radially disposed to be spaced apart from each other in a circumferential direction. In the present preferred embodiment, a total number of rotor magnets is preferably eight, for example. The rotor core 111 is arranged between the rotor magnets 112, which are adjacent in the circumferential direction. In the present preferred embodiment, N poles or S poles of the rotor magnets 112 are disposed in the rotor 11 in the circumferential direction. A magnetic flux generated due to the adjacent rotor magnets 112 is generated between outer circumferential surfaces of the rotor core 111 and the stator 10. Since a total number of outer circumferential surfaces is preferably eight, the total number of magnetic poles of the rotor 11 is preferably eight, for example. However, in a configuration of the rotor magnet 112, for example, the N pole or S pole may also be disposed in the diameter direction. In addition, the rotor magnet 112 may also be at least one annular or substantially annular shaped magnet in which N poles and S poles are alternately magnetized.

The motor 1 preferably includes an upper bearing 13a disposed above the rotor 11 and a lower bearing 13b disposed under the rotor 11. The shaft 12 is supported by the upper bearing 13a and the lower bearing 13b to be rotatable about the central axis A. The rotor 11 rotates with the shaft 12.

As illustrated in FIGS. 1 and 2, the stator 10 includes the stator core 101. The stator core 101 is preferably defined by stacking the plurality of magnetic steel plates in the axial direction. The stator core 101 may be defined of one member and may also be defined by combining a plurality of members. The stator core 101 includes a plurality of teeth T spaced a distance from each other in the circumferential direction and that face the rotor magnet 112. Specifically, the plurality of teeth T are preferably disposed to be spaced an equidistance from each other in the circumferential direction. In the present preferred embodiment, the total number of teeth T is twelve. The stator core 101 includes a core back 101a having an annular or substantially annular shape. The teeth T protrude inward from the annular or substantially annular shaped core back 101a in the diameter direction. The total number of slots S positioned between the adjacent teeth T in the circumferential direction is preferably six or more, for example. In the present preferred embodiment, the total number of slots S is twelve, for example. A ratio of the total number of magnetic poles of the rotor 11 to the total number of slots S is 2:3, for example.

The stator 10 includes conductive wires 102 wound around the plurality of teeth T. In the present preferred embodiment, the plurality of teeth T are vertically covered by insulators 104 made from an insulating member. That is, specifically, the conductive wires 102 are wound around the teeth T over the insulators 104. As the conductive wires 102 are wound around the teeth T, coils are defined. A magnetic field is generated by applying current to the coils, and the rotor 11 rotates. The coils will be described in detail below.

As illustrated in FIG. 1, the motor 1 preferably includes a bracket 14 in a cylindrical or an approximately cylindrical shape having a bottom. The bracket 14 is disposed outward from the stator 10 in the diameter direction and surrounds the stator 10. A cylindrical portion 141 having a diameter which is less than that of the bracket 14 is installed on a central portion of a lower surface of the bracket 14. An inner space of the bracket 14 communicates with an inner space of the cylindrical portion 141. Specifically, the cylindrical portion 141 includes two cylindrical portions 141a and 141b disposed in the axial direction and having different diameters. A diameter of the upper cylindrical portion 141a is greater than that of the lower cylindrical portion 141b. A lower bearing 13b is disposed on the upper cylindrical portion 141a. An oil seal, which is not illustrated, is disposed on the lower cylindrical portion 141b. A flange portion 142 having an awning or substantially awning shape protruding in the diameter direction is provided at an upper end of the bracket 14.

The motor 1 includes a busbar holder 16 that supports a busbar 15. The busbar holder 16 is preferably made of a resin material and is formed by insert-molding the busbar 15, for example. The busbar holder 16 is disposed at one side of the rotor 11 in the axial direction. The busbar holder 16 includes a body portion 161 having a cylindrical or substantially cylindrical shape. The busbar holder 16 includes a connector portion 162 extending from a portion of the body portion 161 in the circumferential direction toward the outside in the diameter direction. A central hole 161a having a circular or substantially circular shape about the central axis A is preferably defined in the body portion 161. A shaft 12 is inserted into and passes through the central hole 161a. A bearing holder 163 that supports the upper bearing 13a is installed on a circumference of the central hole 161a. The connector portion 162 extends outward from the flange portion 142 in the diameter direction. Power is externally supplied to the motor 1 through the connector portion 162. The busbar 15 will be described in detail below. In addition, the connector portion 162 corresponds to an external motor connecting portion of the above-described motor.

The motor 1 preferably includes a cover 17 provided in a cylindrical or an approximately cylindrical shape to cover an upper end of the bracket 14. A flange portion 171 having an awning or substantially awning shape protruding in the diameter direction is provided at a lower end of the cover 17. A protrusion portion 172 that covers a portion of the connector portion 162 is provided on the cover 17. The protrusion portion 172 protrudes from a main body of the cover 17 in the diameter direction. The flange portion 171 overlaps the flange portion 142 of the bracket 14 so that the cover 17 covers the busbar holder 16. The cover 17 defines an outer frame of the motor 1 with the bracket 14.

Figure 3:
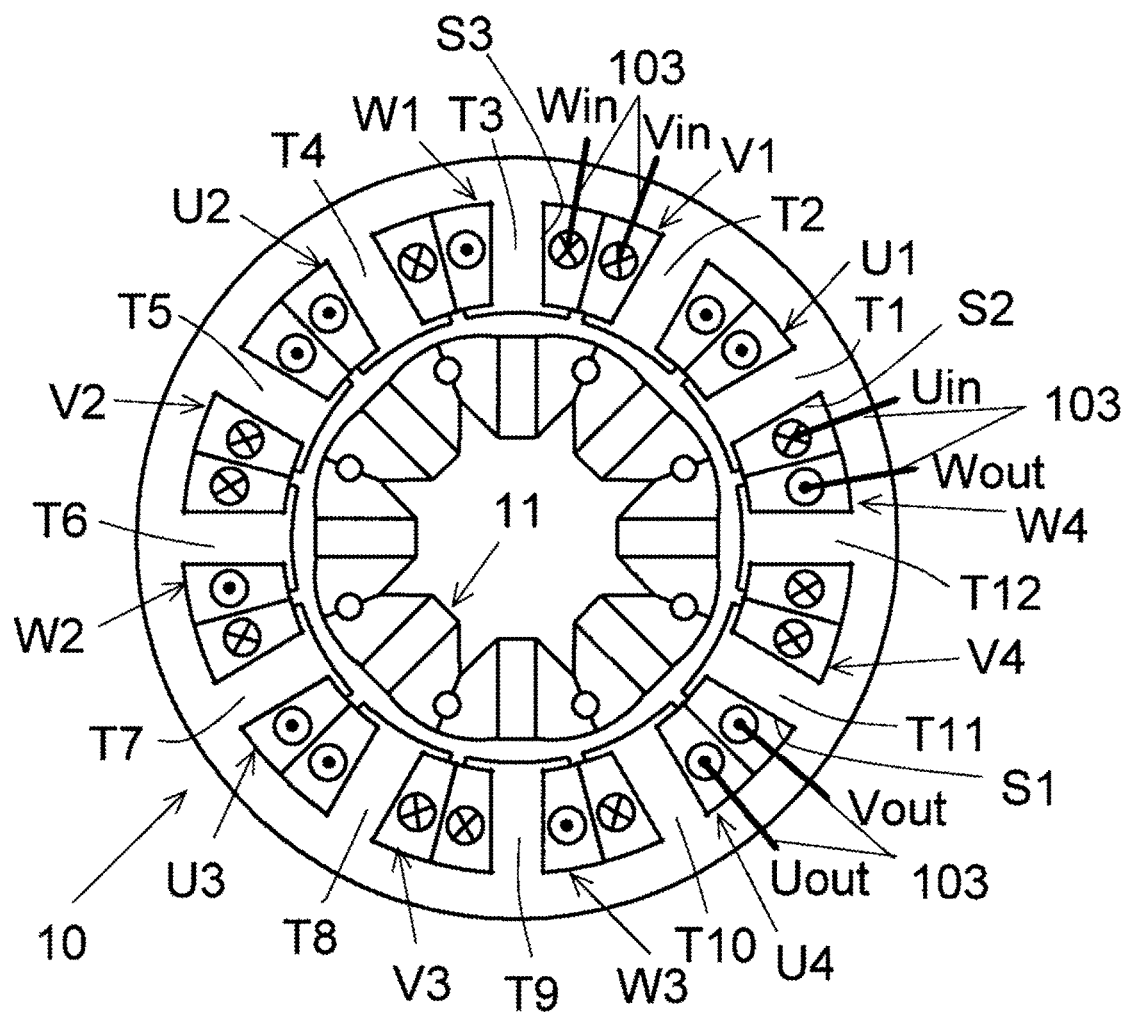
FIG. 3 is a first schematic view for describing a method of winding conductive wires of three phases included in the motor around teeth according to the first preferred embodiment of the present disclosure.
Figure 4:
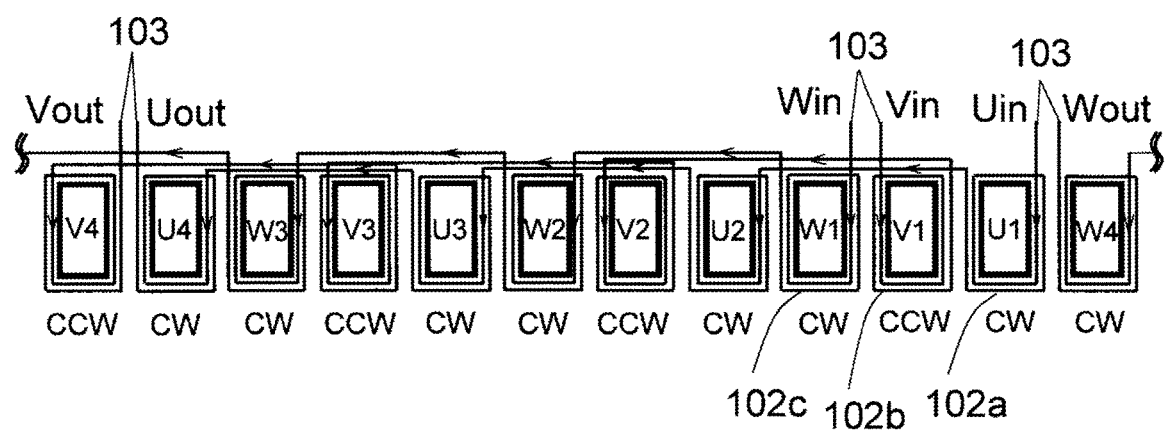
FIG. 4 is a second schematic view for describing the method of winding the conductive wires of three phases included in the motor around the teeth according to the first preferred embodiment of the present disclosure.

The conductive wires 102 include conductive wires of three phases corresponding to a U-phase, a V-phase, and a W-phase. The conductive wires of three phases are delta connected. FIG. 3 is a first schematic view for describing a method of winding the conductive wires of three phases included in the motor 1 around the teeth according to the first preferred embodiment of the present disclosure. FIG. 4 is a second schematic view for describing the method of winding the conductive wires of three phases included in the motor 1 around the teeth according to the first preferred embodiment of the present disclosure. In FIG. 4, the plurality of coils are illustrated as straight lines for the sake of convenience. In the present preferred embodiment, as illustrated in FIG. 3, the first to twelfth teeth T1 to T12 are disposed in the stator core 101 toward one side sequentially in the circumferential direction in a plane view thereof when seen from above in the axial direction. In this specification, one side in the circumferential direction is a side disposed in the counterclockwise direction.

Any one of the conductive wires 102a, 102b, and 102c of three phases is wound around each of the teeth T, and the plurality of coils are formed. At least two coils of each of the U-phase, V-phase, and W-phase are connected in series. A direction in which the U-phase and W-phase conductive wires 102a and 102c are wound around the teeth T is an opposite direction in which the V-phase conductive wire 102b is wound around the teeth T.

In the present preferred embodiment, as illustrated in FIGS. 3 and 4, in a state in which one end Uin of the U-phase conductive wire 102a remains as a drawing line 103, the conductive wire 102a is wound around the first tooth T1 a predetermined number of times. A direction in which the U-phase conductive wire 102a is wound is the clockwise (CW) direction. As the U-phase conductive wire 102a is wound around the first tooth T1 a predetermined number of times, a first U-phase coil U1 is formed.

After the first U-phase coil U1 is formed, the remaining conductive wire 102a extends from the first tooth T1 toward one side in the circumferential direction and surrounds a third-fourth tooth T4. As the surrounding U-phase conductive wire 102a is wound around the fourth tooth T4 like the first tooth T1, a second U-phase coil U2 is formed. Similarly, a third U-phase coil U3 is formed around the seventh tooth T7, and a fourth U-phase coil U4 is formed around the tenth tooth T10. After the fourth U-phase coil U4 is formed, the other end Uout of the U-phase conductive wire 102a becomes the drawing line 103.

In a state in which one end Vin of the V-phase conductive wire 102b remains as the drawing line 103, the V-phase conductive wire 102b is wound around the second tooth T2 a predetermined number of times. A direction in which the V-phase conductive wire 102b is wound is the counterclockwise (CCW) direction. As the V-phase conductive wire 102b is wound around the second tooth T2 a predetermined number of times, a first V-phase coil V1 is formed.

After the first V-phase coil V1 is formed, the remaining conductive wire 102b extends toward one side from the second tooth T2 in the circumferential direction and surrounds the third-fifth tooth T5. As the surrounding V-phase conductive wire 102b is wound around the fifth tooth T5 like the second tooth T2, a second V-phase coil V2 is formed. Similarly, a third V-phase coil V3 is formed around the eighth tooth T8, and a fourth V-phase coil V4 is formed around the eleventh tooth T11. After the coil V4 of the fourth V-phase is formed, the other end Vout of the V-phase conductive wire 102b becomes a drawing line 103.

In a state in which one end Win of the W-phase conductive wire 102c remains as the drawing line 103, the conductive wire 102c is wound around the third tooth T3 a predetermined number of times. A direction in which the W-phase conductive wire 102c is wound is the CW direction. As the W-phase conductive wire 102c is wound around the third tooth T3 a predetermined number of times, a first W-phase coil W1 is formed.

After the first W-phase coil W1 is formed, the remaining conductive wire 102c extends toward one side from the third tooth T3 in the circumferential direction and surrounds the third-sixth tooth T6. As the surrounding W-phase conductive wire 102c is wound around the sixth tooth T6 like the third tooth T3, a second W-phase coil W2 is formed. Similarly, a third W-phase coil W3 is formed around the ninth tooth T9, and a fourth W-phase coil W4 is formed around the twelfth tooth T12. After the coil W4 of the fourth W-phase is formed, the other end Wout of the W-phase conductive wire 102c becomes a drawing line 103.

Ends Uin, Uout, Vin, Vout, Win, and Wout of the conductive wires 102a to 102c of three phases each include a drawing line 103 withdrawn from one side in the axial direction. In the present preferred embodiment, all of the drawing lines 103 are withdrawn upward. As illustrated in FIG. 3, the plurality of coils U1 to U4, V1 to V4, and W1 to W4 in which any one of the conductive wires 102a to 102c of three phases is wound around the teeth T are repeatedly disposed in order of the U-phase, V-phase, and W-phase in the circumferential direction. In the present preferred embodiment, a total number of repetitions is four, for example. That is, the U-phase, V-phase, and W-phase coils are disposed at every 90 degrees.

Figure 5:
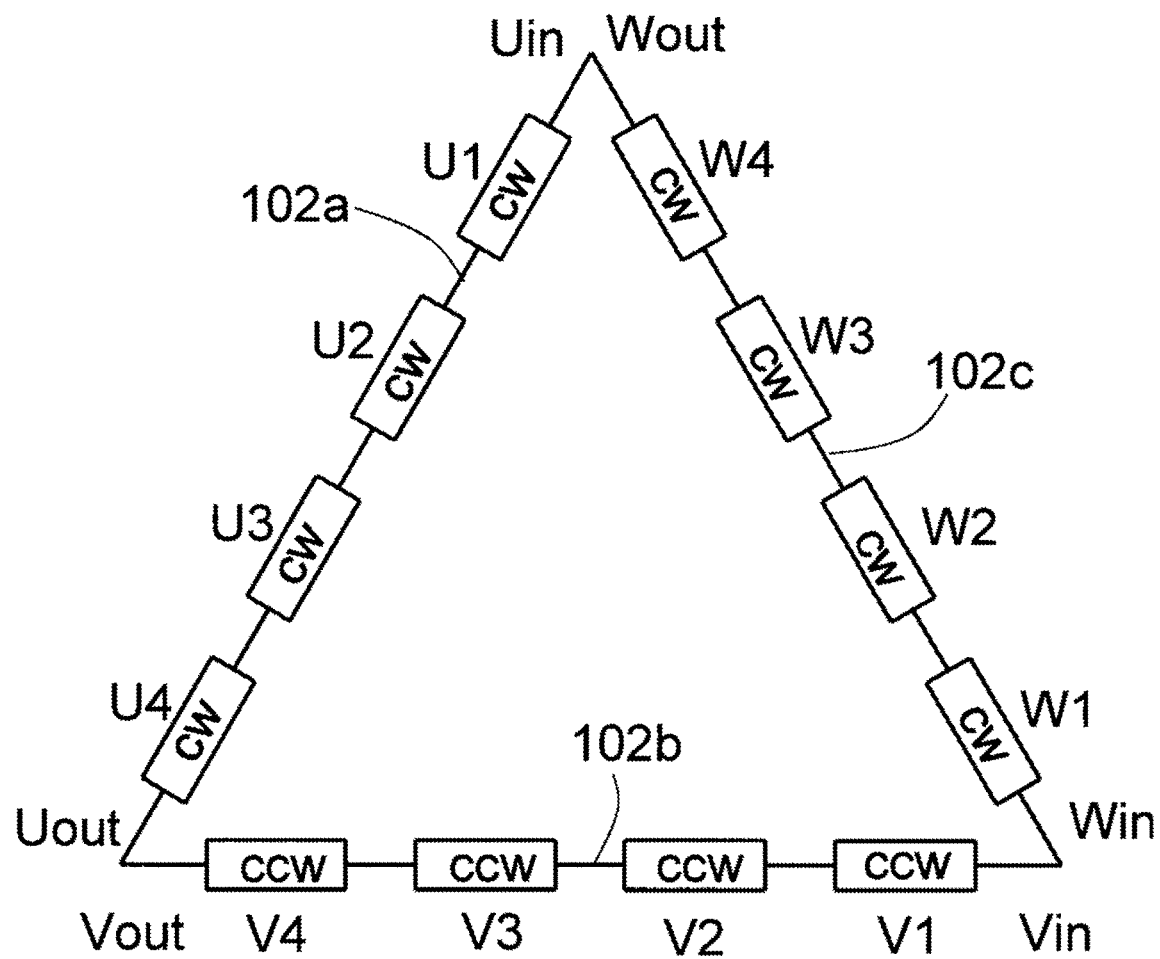
FIG. 5 is a schematic view illustrating delta connection of conductive wires of three phases included in the motor according to the first preferred embodiment of the present disclosure.

FIG. 5 is a schematic view illustrating a delta connection of the conductive wires 102a to 102c of three phases included in the motor according to the first preferred embodiment of the present disclosure. As illustrated in FIG. 5, in the present preferred embodiment, in each of the U-phase, V-phase, and W-phase, four coils are connected in series by one conductive wire. One end Uin of the U-phase conductive wire 102a is connected to the other end Wout of the W-phase conductive wire 102c. The other end Uout of the U-phase conductive wire 102a is connected to the other end Vout of the V-phase conductive wire 102b. One end Vin of the V-phase conductive wire 102b is connected to one end Win of the W-phase conductive wire 102a. The ends of the connected three conductive wires are connected to a power source outside the motor. In addition, the above-described positions in which the conductive wires 102a to 102c of three phases start and end winding are examples. The positions may be properly changed. For example, the above-described positions in which the conductive wires 102a to 102c of phases start and end winding may be switched.

As illustrated in FIG. 3, in each of the U-phase, the V-phase, and the W-phase, the serially connected coils are preferably adjacent in the circumferential direction. For example, the first U-phase coil U1 and the second U-phase coil U2 connected in series are adjacent in the circumferential direction in the U-phase coils U1 to U4. Similarly, the second U-phase coil U2 and the third U-phase coil U3 connected in series, and the third U-phase coil U3 and the fourth U-phase coil U4 connected in series are adjacent in the circumferential direction. The V-phase and W-phase coils connected in series are formed similarly to the U-phase coils U1 to U4.

A plurality of slots S include a first slot S1 from which the U-phase and V-phase drawing lines 103 are withdrawn. The plurality of slots S include a second slot S2 from which the U-phase and W-phase drawing lines 103 are withdrawn. The plurality of slots S include a third slot S3 from which the V-phase and W-phase drawing lines 103 are withdrawn. In the present preferred embodiment, the first slot S1 is defined between the tenth tooth T10 and the eleventh tooth T11. The second slot S2 is defined between the twelfth tooth T12 and the first tooth T1. The third slot S3 is defined between the second tooth T2 and the third tooth T3.

The slot S provided between the eleventh tooth T11 and the twelfth tooth T12 is disposed between the first slot S1 and the second slot S2 in the circumferential direction. The slot S provided between the first tooth T1 and the second tooth T2 is disposed between the second slot S2 and the third slot S3 in the circumferential direction. That is, the first slot S1 and the second slot S2, and the second slot S2 and the third slot S3, are each disposed one slot apart in the circumferential direction.

In each of the U-phase, V-phase, and W-phase, the plurality of coils U1 to U4, V1 to V4, and W1 to W4 are connected in series. The total number of the slots S is twelve or more, for example. The first slot S1, the second slot S2, and the third slot S3 are preferably disposed within about 180 degrees in the circumferential direction. In the present preferred embodiment, the total number of the slots S is twelve, and three slots S1 to S3 are preferably disposed within 150 degrees in the circumferential direction, for example. That is, a range within which the drawing lines 103 are withdrawn is 150 degrees in the circumferential direction.

In the present preferred embodiment, the U-phase and V-phase drawing lines 103 to be connected may be adjacent, the V-phase and W-phase drawing lines 103 to be connected may be adjacent, and the W-phase and U-phase drawing lines 103 to be connected may be adjacent. Specifically, the connected drawing lines 103 are withdrawn from the same slot S. Accordingly, a connection structure of the drawing lines 103 is able to be simplified.

In the present preferred embodiment, the three slots S1 to S3 from which the drawing lines 103 are withdrawn are preferably each disposed one slot apart in the circumferential direction. Specifically, the three slots S1 to S3 are disposed within 150 degrees in the circumferential direction. Accordingly, a range within which the drawing lines 103 are present in the circumferential direction is able to be small. Therefore, spaces, in which connecting units of the drawing lines 103, such as the busbar 15, are disposed after the drawing lines 103 are connected, may be spatially reduced.

In the stator 10 of the present preferred embodiment, the U-phase coil, the V-phase coil, and the W-phase coil are repeatedly disposed in the circumferential direction. In an eight-pole rotor 11, coils for a U-phase, a V-phase, and a W-phase are disposed at every 90 degrees. Therefore, the motor having an excellent magnetic property balance may be provided according to the present preferred embodiment.

Figure 6:
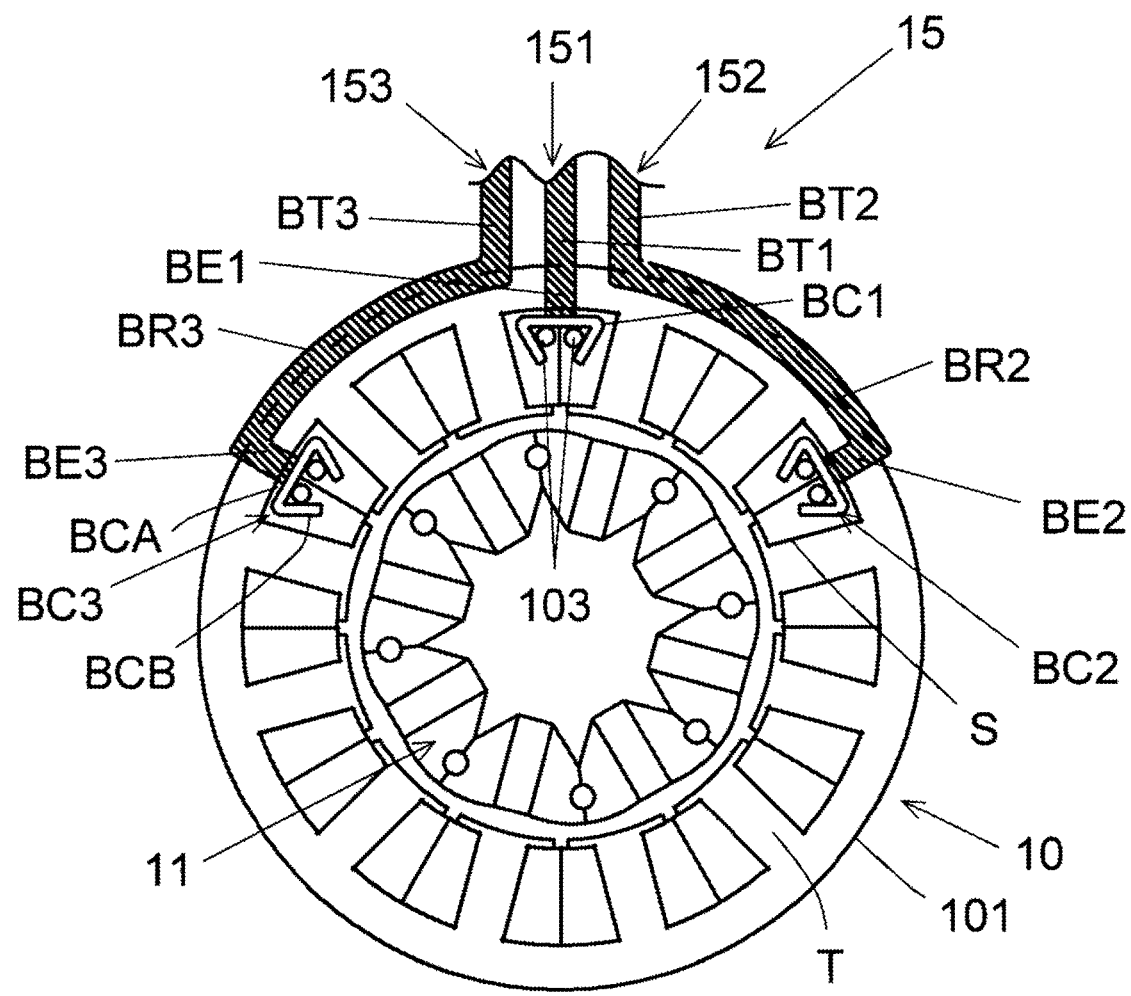
FIG. 6 is a schematic plan view illustrating a configuration of a busbar included in the motor according to the first preferred embodiment of the present disclosure.

FIG. 6 is a schematic plan view illustrating a configuration of the busbar 15 included in the motor 1 according to the first preferred embodiment of the present disclosure. In FIG. 6, the stator 10 and the rotor 11 are illustrated for the sake of convenience of understanding. In addition, in FIG. 6, a busbar holder 16 is not illustrated. As illustrated in FIGS. 1 and 6, the motor 1 includes the busbar 15 connected to the drawing lines 103.

The busbar 15 includes connecting portions BC1 to BC3 connected to the drawing lines 103. The busbar 15 includes extension portions BE1 to BE3 extending outward from the respective connecting portions BC1 to BC3 in the diameter direction. The connecting portions BC1 to BC3 are preferably defined by metal plates extending in the axial direction. Specifically, the connecting portions BC1 to BC3 include flat portions BCA and bent portions BCB. The flat portion BCA is positioned outward from the drawing line 103 in the diameter direction, and extends in the circumferential direction. The bent portions BCB are preferably provided at both ends of the flat portion BCA in the circumferential direction and formed by being bent inward from the flat portion BCA in the diameter direction.

As illustrated in FIG. 1, the connecting portions BC1 to BC3 are disposed above the stator 10. Portions of the drawing lines 103 withdrawn upward are fitted by the flat portion BCA and the bent portions BCB and electrically connected to the connecting portions BC1 to BC3. The extension portions BE1 to BE3 are connected to the flat portions BCA and extend outward from the flat portions BCA in the diameter direction. In addition, the connecting portion BC1 connects the U-phase and W-phase drawing lines 103. The connecting portion BC2 connects the U-phase and V-phase drawing lines 103. The connecting portion BC3 connects the V-phase and W-phase drawing lines 103.

In the present preferred embodiment, the busbar 15 preferably includes a first busbar 151, a second busbar 152, and a third busbar 153. The first busbar 151 is arranged between the second busbar 152 and the third busbar 153 in the circumferential direction. The first busbar 151 includes the connecting portion BC1 and the extension portion BE1. The first busbar 151 includes a first terminal portion BT1 extending outward from the extension portion BE1 in the diameter direction. In the present preferred embodiment, the first terminal portion BT1 extends from an end of the extension portion BE1. The first terminal portion BT1 includes a portion BT1*a* extending downward, is disposed under the extension portion BE1, and extends outward in diameter direction. A front end BT1*b* of the first terminal portion BT1 is exposed to the outside at an outer portion 162*a* of the connector portion 162 in the diameter direction.

The second busbar 152 and the third busbar 153 respectively include the connecting portions BC2 and BC3 and the extension portions BE2 and BE3. The second busbar 152 and the third busbar 153 respectively include relay portions BR2 and BR3 extending from the respective extension portions BE2 and BE3 in the circumferential direction. The relay portions BR2 and BR3 have an arched or substantially arched shape. The relay portions BR2 and BR3 are positioned above an edge of an outer circumference of the stator 10. In the present preferred embodiment, the relay portion BR2 included in the second busbar 152 extends from an end of the extension portion BE2 in the CCW direction in a plan view thereof when seen from above in the axial direction and extends to a vicinity of the first busbar 151. The relay portion BR3 included in the third busbar 153 extends from an end of the extension portion BE3 in the CW direction in a plan view thereof when seen from above in the axial direction, and extends to a vicinity of the first busbar 151.

The second busbar 152 and the third busbar 153 respectively include second terminal portions BT2 and BT3 extending outward from the respective relay portions BR2 and BR3 in the diameter direction. In the present preferred embodiment, the second terminal portions BT2 and BT3 respectively extend from ends of the relay portions BR2 and BR3. The second terminal portions BT2 and BT3 include portions extending downward and extend outward in the diameter direction from positions at the same height of the first terminal portion BT1. Front ends of the second terminal portions BT2 and BT3 are exposed to the outside at an outer portion of the connector portions 162 in the diameter direction.

According to the present preferred embodiment, as the busbar 15 is used, the drawing lines 103 are preferably electrically connected to the connector portion 162 defined at an outer side of the motor 1 in the diameter direction. Therefore, the motor 1 is prevented from becoming larger in the axial direction due to the connector portion 162, and the motor 1 can be miniaturized. In the present preferred embodiment, in a state in which three busbars 151 to 153 are collected at one portion of the motor 1 in the circumferential direction, three busbars 151 to 153 extend outward in the diameter direction of the motor 1. Therefore, a size of the connector portion 162 in the circumferential direction can preferably be made small. In addition, in the present preferred embodiment, as three busbars 151 to 153 are collected at one portion in the circumferential direction, a range in which the drawing lines 103 are dispersed in the circumferential direction is narrow, and thus a use amount of the busbar 15 is able to be reduced.

A motor 1*a* of a second preferred embodiment of the present disclosure is preferably generally the same as the motor 1 of the first preferred embodiment. Accordingly, the same symbols are assigned to portions which are the same as those of the first preferred embodiment, and descriptions thereof will be omitted in a case in which specific descriptions are not needed. In the motor 1*a* of the second preferred embodiment, a configuration of a busbar 15 is different from that of the first preferred embodiment.

FIG. 7 is a schematic longitudinal-sectional view illustrating the motor 1*a* according to the second preferred embodiment of the present disclosure. The motor 1*a* is an inner rotor motor. A busbar holder 16 that supports the busbar 15 is disposed one side of a rotor 11 in an axial direction. The busbar holder 16 includes an opening 164 that exposes connecting portions BC4 to BC6 of the busbar 15. In the present preferred embodiment, the opening 164 is a through hole extending in the axial direction. However, the opening 164 is not limited to the through hole, but may also be a concave portion. In the case in which the opening 164 is the concave portion, the concave portion opens toward a side from which drawing lines 103 are withdrawn. The connecting portions BC4 to BC6 are positioned in the opening 164. The drawing lines 103 are connected to the connecting portions BC4 to BC6 via the opening 164.

Figure 8:
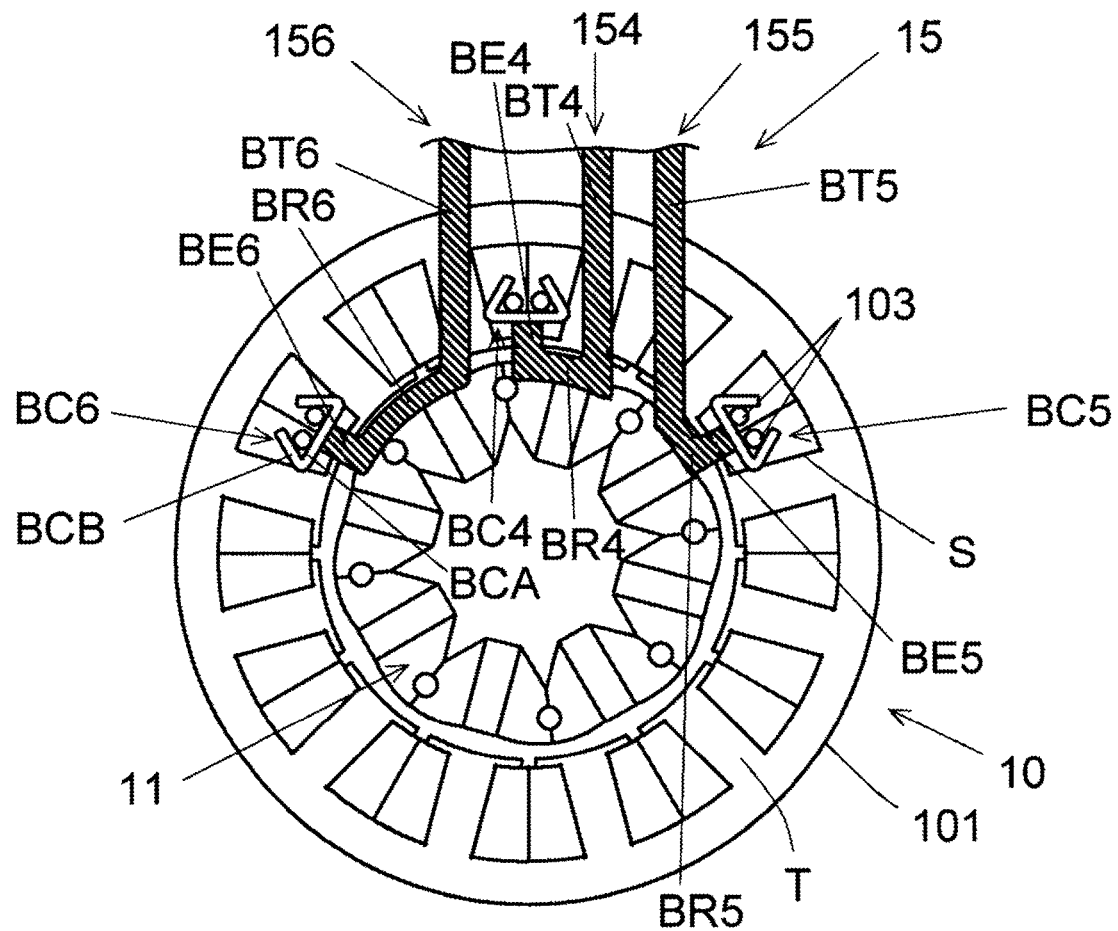
FIG. 8 is a schematic plan view illustrating a configuration of a busbar included in the motor according to the second preferred embodiment of the present disclosure.

FIG. 8 is a schematic plan view illustrating the configuration of the busbar 15 included in the motor 1*a* according to the second preferred embodiment of the present disclosure. In FIG. 8, a stator 10 and the rotor 11 are illustrated for the sake of convenience of understanding. In addition, in FIG. 8, the busbar holder 16 is not illustrated for the sake of convenience of understanding. As illustrated in FIG. 8, in the present preferred embodiment, the busbar 15 preferably includes a first busbar 154, a second busbar 155, and a third busbar 156. The first busbar 154 is arranged between the second busbar 155 and the third busbar 156 in a circumferential direction.

Three busbars 154 to 156 respectively include the connecting portions BC4 to BC6 connected to the drawing lines 103. The connecting portions BC4 to BC6 are preferably defined by metal plates extending in the axial direction. Specifically, the connecting portions BC4 to BC6 include flat portions BCA and bent portions BCB. The flat portion BCA is positioned inward from the drawing line 103 in a diameter direction and extends in the circumferential direction. The bent portions BCB are defined at both ends of the flat portion BCA in the circumferential direction and formed by being bent outward from the flat portion BCA in the diameter direction. Portions of the drawing lines 103 withdrawn upward are fitted by the flat portions BCA and the bent portions BCB and electrically connected to the connecting portions BC4 to BC6. In addition, the connecting portion BC4 connects the U-phase and W-phase drawing lines 103. The connecting portion BC5 connects the U-phase and V-phase drawing lines 103. The connecting portion BC6 connects the V-phase and W-phase drawing lines 103.

Three busbars 154 to 156 respectively include extension portions BE4 to BE6 extending inward from the respective connecting portions BC4 to BC6 in the diameter direction. The extension portions BE4 to BE6 are connected to the flat portions BCA and extend inward from the flat portions BCA in the diameter direction.

Three busbars 154 to 156 respectively include relay portions BR4 to BR6 extending from ends of the extension portions BE4 to BE6 in the circumferential direction. The relay portions BR4 to BR6 preferably have an arched or substantially arched shape. The relay portions BR4 to BR6 are positioned above an edge of an outer circumference of the rotor 11. In the present preferred embodiment, the relay portion BR3 included in the first busbar 154 extends from the end of the extension portion BE4 in the CW direction in a plan view thereof when seen from above in the axial direction. The relay portion BR5 included in the second busbar 155 extends from the end of the extension portion BE5 in the CCW direction in a plan view thereof when seen from above in the axial direction, and extends to a vicinity of the relay portion BR4. The relay portion BR6 included in the third busbar 156 extends from the end of the extension portion BE6 in the CW direction in a plan view thereof when seen from above in the axial direction and extends to a vicinity of the relay portion BR4.

Three busbars 154 to 156 respectively include third terminal portions BT4 to BT6 extending outward from ends of the relay portions BR4 to BR6 in the diameter direction. In the present preferred embodiment, the third terminal portions BT4 to BT6 preferably include steps. That is, the third terminal portions BT4 to BT6 includes portions extending in the axial direction from inner ends in the diameter direction to outer ends in the diameter direction. Front ends of the third terminal portions BT4 to BT6 are exposed to the outside at an outer portion of the connector portion 162 in the diameter direction.

In the present preferred embodiment, similar to the first preferred embodiment, in a state in which three busbars 154 to 156 are collected at one portion of the motor 1a in the circumferential direction, three busbars 154 to 156 extend outward in the diameter direction of the motor 1a. Therefore, a size of the connector portion 162 is able to be small in the circumferential direction. In addition, in the present preferred embodiment, when three busbars 154 to 156 are collected at one portion in the circumferential direction, since a range in which the drawing lines 103 are dispersed in the circumferential direction is small, a use amount of the busbar 15 is able to be reduced. In addition, since the configuration of the present preferred embodiment includes the extension portions BE4 to BE6 extending inward in the diameter direction, connecting units such as a connector may be disposed above the rotor 11. In the case of that configuration, a diameter of the motor 1b is able to be miniaturized.

A motor 1b of a third preferred embodiment is preferably generally the same as the motor 1 of the first preferred embodiment. Accordingly, the same symbols are assigned to portions which are the same as those of the first preferred embodiment, and descriptions thereof will be omitted in a case in which specific descriptions are not needed. In the motor 1b of the third preferred embodiment, a configuration of a busbar 15 is different from that of the first preferred embodiment.

FIG. 9 is a schematic longitudinal-sectional view illustrating the motor 1b according to the third preferred embodiment of the present disclosure. In the third preferred embodiment, the motor 1b preferably includes a bearing holder 18 instead of a busbar holder 16. The bearing holder 18 is disposed above a rotor 11. The bearing holder 18 includes a body portion 181 having a cylindrical or substantially cylindrical shape and a cable withdrawing portion 182 extending outward in a diameter direction from a portion of the body portion 181 in a circumferential direction. A central hole 181a having a circular or substantially circular shape around a rotating shaft A is preferably defined in the body portion 181. A shaft 12 is inserted into and passes through the central hole 181a. A supporting portion 183 that supports an upper bearing 13a is provided on a circumference of the central hole 181a. The cable withdrawing portion 182 includes a through hole, through which cables pass, and extends in the diameter direction. A cover 17 covers the bearing holder 18. An insulator 104 is arranged between teeth T and conductive wires 102.

Figure 10:
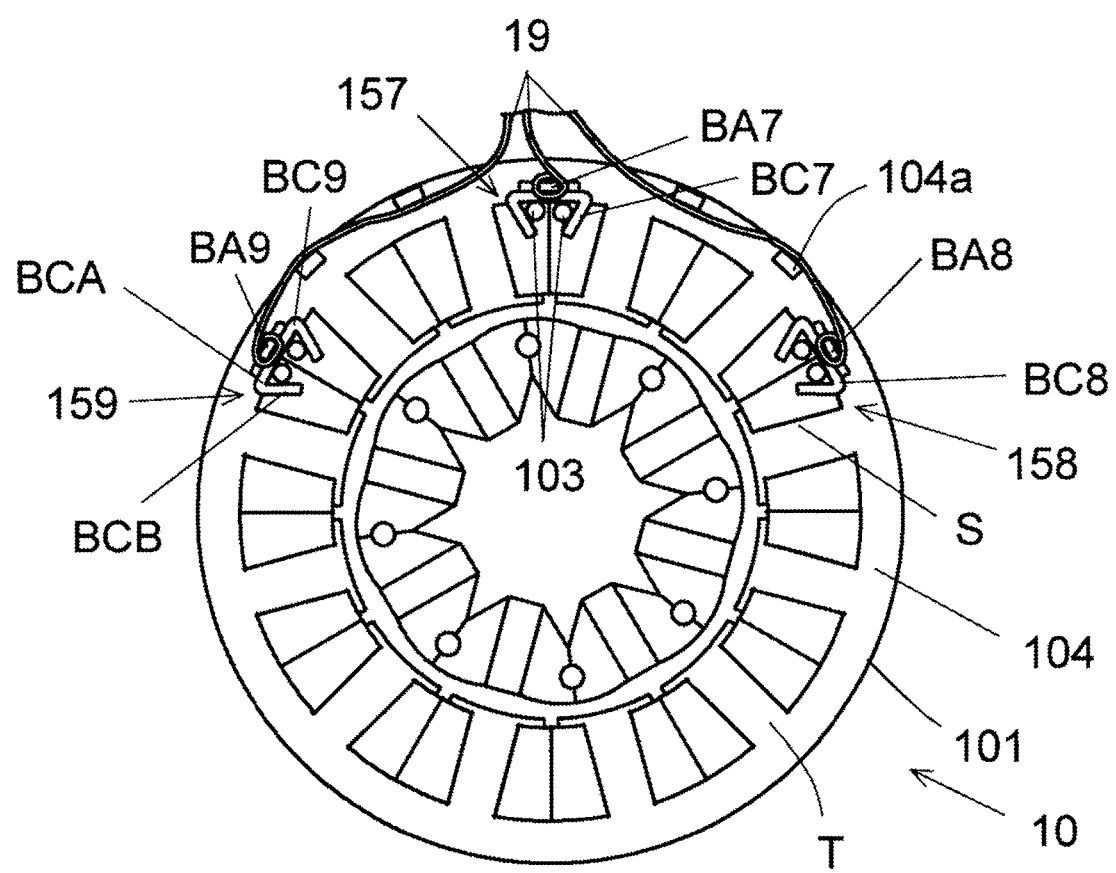
FIG. 10 is a schematic plan view illustrating a configuration of a busbar included in the motor according to the third preferred embodiment of the present disclosure.

FIG. 10 is a schematic plan view illustrating the configuration of the busbar 15 included in the motor 1b according to the third preferred embodiment of the present disclosure. In FIG. 10, a stator 10 and the rotor 11 are illustrated for the sake of convenience of understanding. As illustrated in FIGS. 9 and 10, drawing lines 103 are connected to the busbar 15 protruding toward one side from the insulator 104 in an axial direction. In the present preferred embodiment, the busbar 15 protrudes upward from an upper surface side of the insulator 104. The busbar 15 is disposed at an end of the insulator 104 in the diameter direction.

As illustrated in FIG. 10, in the present preferred embodiment, the busbar 15 preferably includes a first busbar 157, a second busbar 158, and a third busbar 159. The first busbar 157 is arranged between the second busbar 158 and the third busbar 159 in the circumferential direction. The busbars 157 to 159 are disposed outward in the diameter direction of slots S from which the drawing lines 103 are withdrawn.

Three busbars 157 to 159 respectively include connecting portions BC7 to BC9 connected to the drawing lines 103. The connecting portions BC7 to BC9 are preferably defined by metal plates extending in the axial direction. Specifically, the connecting portions BC7 to BC9 include flat portions BCA and bent portions BCB. The flat portions BCA are positioned outward from the drawing lines 103 in the diameter direction, and extend in the circumferential direction. The bent portions BCB are provided at both ends of the flat portions BCA in the circumferential direction, and formed by being bent inward from the flat portions BCA in the diameter direction. Portions of the drawing lines 103 withdrawn upward are fitted by the flat portions BCA and the bent portions BCB and respectively electrically connected to the connecting portions BC7 to BC9. In addition, the connecting portion BC7 connects the U-phase and W-phase drawing lines 103. The connecting portion BC8 connects the U-phase and V-phase drawing lines 103. The connecting portion BC9 connects the V-phase and W-phase drawing lines 103.

Three busbars 157 to 159 respectively include attaching portions BA7 to BA9 respectively disposed outward from the connecting portions BC7 to BC9 in the diameter direction. The attaching portions BA7 to BA9 respectively support the connecting portions BC7 to BC9. The attaching portions BA7 to BA9 may also be integrally defined together with the connecting portions BC7 to BC9. The attaching portions BA7 to BA9 include portions protruding upward from the connecting portions BC7 to BC9. Cables 19 are attached to the protruding portions. The cables 19 attached to the attaching portions BA7 to BA9 are collected at one portion in the circumferential direction and withdrawn to the outside from a cable withdrawing portion 182. In the present preferred embodiment, three cables 19 are collected at a vicinity of a position at which the first busbar 157 is installed. The cables 19 withdrawn to the outside are preferably connected to, for example, a power supply portion and the like.

In the present preferred embodiment, a hook portion 104a that hooks the cables 19 is preferably defined on an upper portion of the insulator 104. The cables 19 may be fixed at a predetermined position and easily treated by the hook portion 104a. The hook portion 104a that hooks the cable 19 is not limited to being provided on the insulator 104, but for example, may also be defined on the bearing holder 18.

According to the present preferred embodiment, the busbar 15 is supported by the stator 10. Therefore, since a busbar holder does not need to be disposed, the motor 1b is able to be reduced in size or miniaturized.

A motor 1c of a fourth preferred embodiment of the present disclosure is preferably generally the same as the motor 1 of the first preferred embodiment. Accordingly, the same symbols are assigned to portions which are the same as those of the first preferred embodiment, and descriptions thereof will be omitted in a case in which specific descriptions are not needed. In the motor 1c of the fourth preferred embodiment, a configuration related to delta connection of conductive wires 102a to 102c of three phases is preferably different from that of the first preferred embodiment.

Figure 11:
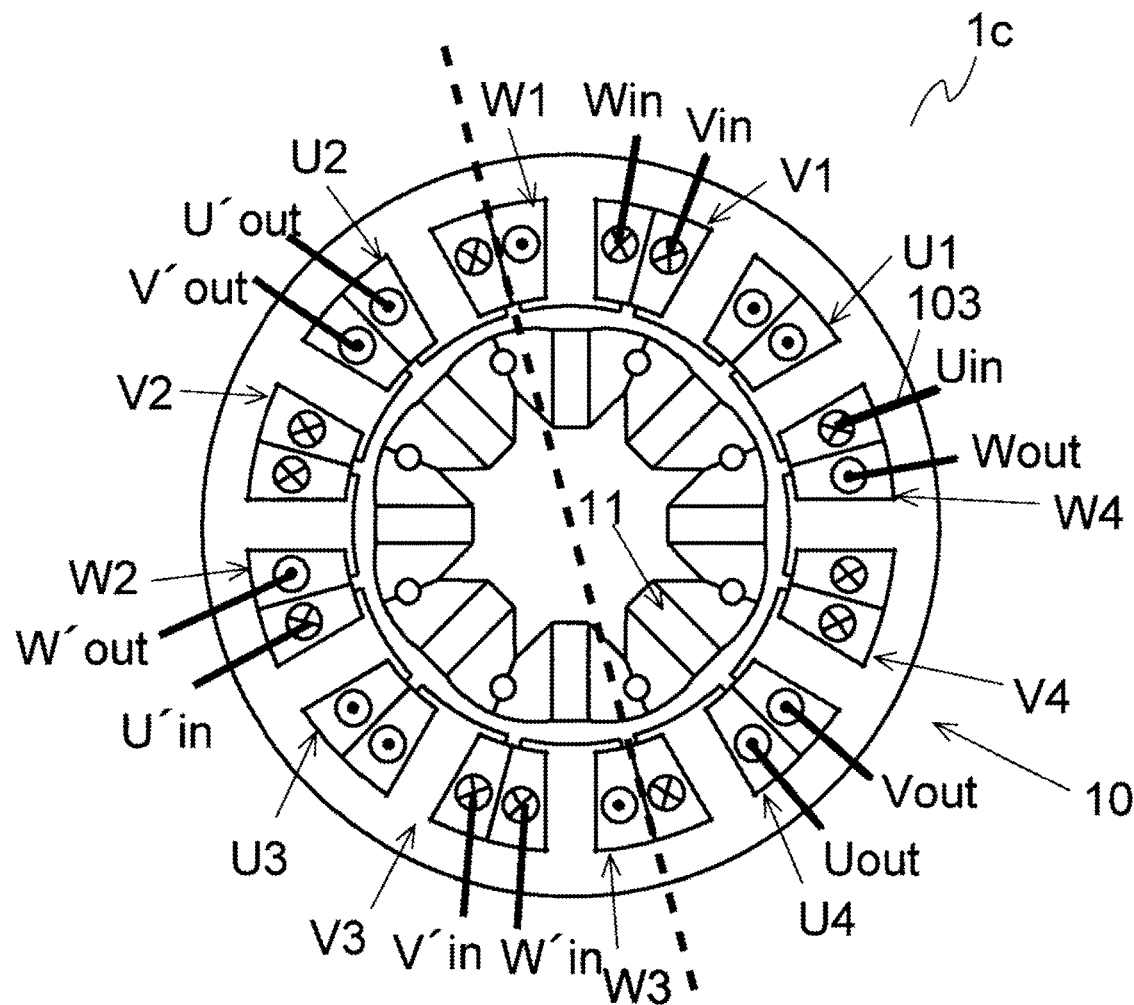
FIG. 11 is a schematic view for describing a method of winding conductive wires of three phases included in a motor around teeth according to a fourth preferred embodiment of the present disclosure.
Figure 12:
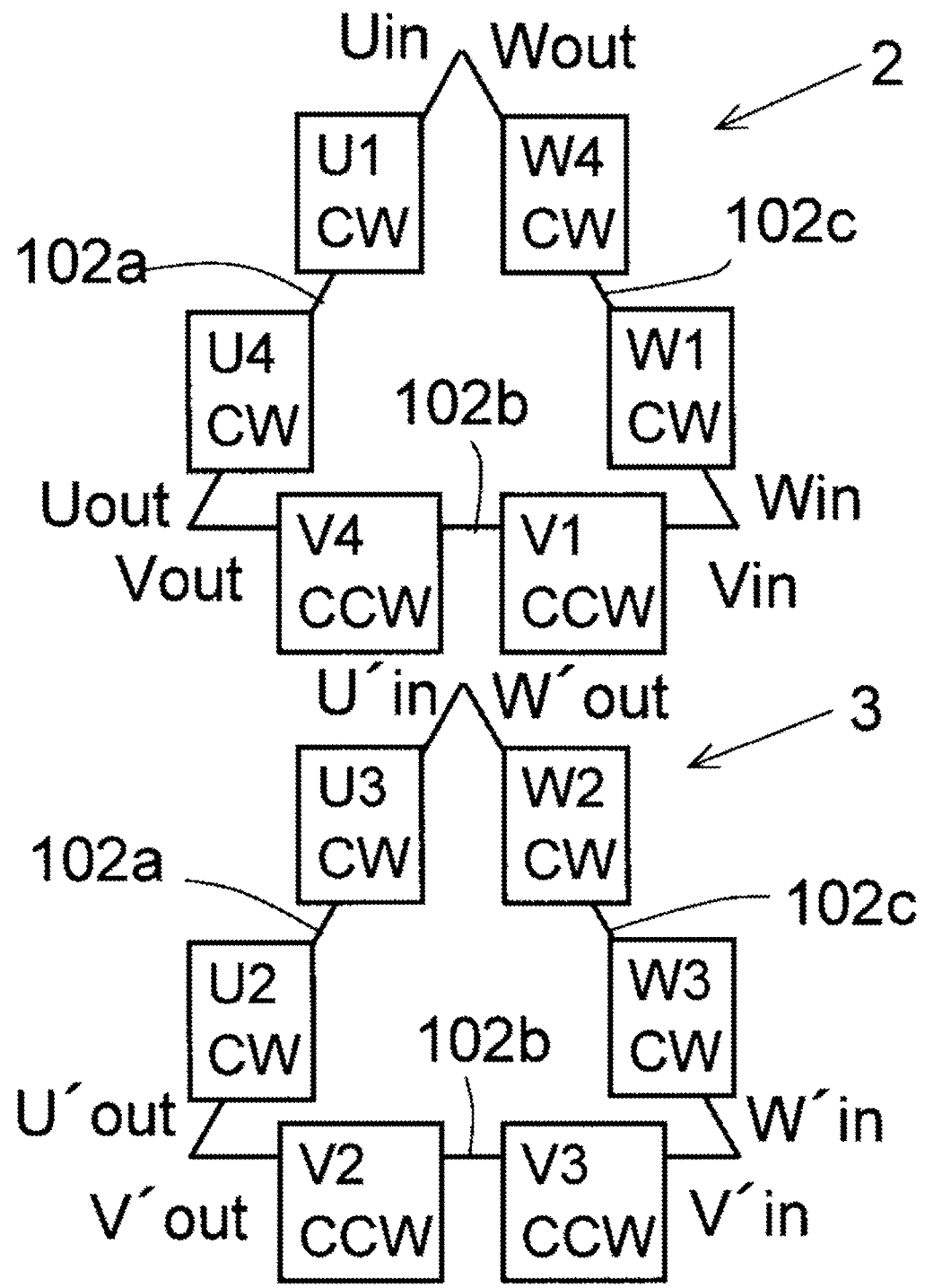
FIG. 12 is a schematic view illustrating delta connection of the conductive wires of three phases included in the motor according to the fourth preferred embodiment of the present disclosure.

FIG. 11 is a schematic view for describing a method of winding the conductive wires 102a to 102c of three phases included in the motor 1c around teeth according to the fourth preferred embodiment of the present disclosure. FIG. 12 is a schematic view illustrating delta connection of the conductive wires 102a to 102c of three phases included in the motor 1c according to the fourth preferred embodiment of the present disclosure.

In the motor 1c of the fourth preferred embodiment, the total number of slots S is twelve or more, for example.

Specifically, the total number of slots S is preferably twelve, for example. The motor 1c include a plurality of connecting bodies in which the U-phase, V-phase, and W-phase conductive wires 102a to 102c are delta connected. In the present preferred embodiment, as illustrated in FIG. 12, the motor 1c preferably includes two connecting bodies including a first connecting body 2 and a second connecting body 3. In addition, the motor 1 of the first preferred embodiment includes one connecting body. The total number of connecting bodies of the first preferred embodiment and that of connecting bodies of the fourth preferred embodiment are different. The first connecting body 2 is provided at one half side of the motor 1c in a circumferential direction. The second connecting body 3 is provided at the other half side of the motor 1c in the circumferential direction.

The first connecting body 2 preferably includes a first U-phase coil U1 and a fourth U-phase coil U4 which are connected in series. The first connecting body 2 includes a first V-phase coil V1 and a fourth V-phase coil V4 which are connected in series. The first connecting body 2 includes a first W-phase coil W1 and a fourth W-phase coil W4 which are connected in series.

As illustrated in FIG. 11, U-phase, V-phase, and W-phase conductive wires respectively include one ends Uin, Vin, and Win as drawing lines and are wound around teeth a predetermined number of times. As the U-phase, V-phase, and W-phase conductive wires are wound around the teeth a predetermined number of times, U-phase coils U1 and U4, V-phase coils V1 and V4, and W-phase coils W1 and W4 are formed. After the first U-phase coil U1 is formed, the remaining conductive wire extends toward the other side from the U-phase coil U1 in the circumferential direction, surrounds a third tooth, and is wound around the tooth to form the fourth U-phase coil U4. Similarly, V-phase coils V1 and V4 and W-phase coils W1 and W4 are formed. A winding direction of two U-phase coils U1 and U4 is the CW direction. The first U-phase coil U1 and the fourth U-phase coil U4 are wound sequentially. A winding direction of two V-phase coils V1 and V4 is the CCW direction. The first V-phase coil V1 and the fourth V-phase coil V4 are wound sequentially. A winding direction of two W-phase coils W1 and W4 is the CW direction. The first W-phase coil W1 and the fourth W-phase coil W4 are wound sequentially.

End Uout of winding end side of two U-phase coils U1 and U4 and end Vout of winding end side of two V-phase coils V1 and V4 are withdrawn from the same slot S and connected. End Vin of winding start side of two V-phase coils V1 and V4 and end Win of winding start side of two W-phase coils W1 and W4 are withdrawn from the same slot S and connected. End Uin of winding start side of two U-phase coils U1 and U4 and end Wout of winding start side of two W-phase coils W1 and W4 are withdrawn from the same slot S and connected.

The second connecting body 3 includes a second U-phase coil U2 and a third U-phase coil U3 which are connected in series. The second connecting body 3 includes a second V-phase coil V2 and a third V-phase coil V3 which are connected in series. The second connecting body 3 includes a second W-phase coil W2 and a third W-phase coil W3 which are connected in series.

The U-phase, V-phase, and W-phase conductive wires respectively include one ends U'in, V'in, W'in as drawing lines and are wound around the teeth a predetermined number of times. As the U-phase, V-phase, and W-phase conductive wires are wound around the teeth a predetermined number of times, U-phase coils U2 and U3, V-phase coils V2 and V3, and W-phase coils W2 and W3 are formed. After the third U-phase coil U3 is formed, the remaining conductive wire extends toward the other side from the third U-phase coil U3 in the circumferential direction, surrounds the third tooth, and is wound around the tooth to form the second U-phase coil U2. Similarly, the V-phase coils V3 and V2 and the W-phase coils W3 and W2 are formed similarly. A winding direction of two U-phase coils U2 and U3 is the CW direction. The third U-phase coil U3 and the second U-phase coil U2 are wound sequentially. A winding direction of two V-phase coils V2 and V3 is the CCW direction. The third V-phase coil V3 and the second V-phase coil V2 are wound sequentially. A direction of two W-phase coils W2 and W3 is the CW direction. The third W-phase coil W3 and the second W-phase coil W2 are wound sequentially.

End U'out of winding end side of two U-phase coils U2 and U3 and end V'out of winding end side of two V-phase coils V2 and V3 are withdrawn from the same slot S and connected. End V'in 2 of winding start side of two V-phase coils V2 and V3 and end W'in of winding start side of two W-phase coils W2 and W3 are withdrawn from the same slot S and connected. End U'in of winding start side of two U-phase coils U2 and U3 and end W'out of winding end side of two W-phase coils W2 and W3 are withdrawn from the same slot S and connected.

In each of two connecting bodies 2 and 3, since the connected drawing lines 103 are withdrawn from the same slot S, a connection structure is simplified. However, a total number of connected drawing lines 103 is greater than that of the first preferred embodiment. Therefore, the configuration of the busbar is appropriately changed from that of the first preferred embodiment.

In the configuration of the present preferred embodiment, the motor 1c is preferably driven like that of the first preferred embodiment. In addition, in the configuration of the present preferred embodiment, the total number of the connecting bodies in which delta connection is performed is two, for example. Therefore, even in a case in which one connecting body is short-circuited, the motor 1c may be driven through the other connecting body. That is, according to the configuration of the present preferred embodiment, the motor 1c with redundancy is able to be provided.

In the above-described preferred embodiments, the total number of poles of the rotor 11 is eight and the total number of slots S is twelve, for example. However, the total numbers of poles and slots S of the rotor 11 are only examples. The configuration of the present disclosure may be applied to a motor in which a ratio of the total numbers of poles to slots is 2:3, for example. For example, the configuration of the present disclosure may be applied to a motor including four poles and six slots, six poles and nine slots, ten poles and fifteen slots, twelve poles and eighteen slots, or the like, for example.

In the above-described preferred embodiments, the winding direction of the U-phase coil and the W-phase coil is preferably the CW direction, and the winding direction of the V-phase coil is preferably the CCW direction. These are only examples, the winding direction of the U-phase coil and the W-phase coil may also be the CCW direction, and the winding direction of the V-phase coil may also be the CW direction.

In the above-described preferred embodiments, the drawing lines 103 are preferably connected to the busbar 15. However, this is only an example. The drawing line 103 may also be directly connected to, for example, a substrate or cable.

In the above-described preferred embodiments and modified preferred embodiments of the present disclosure, the configuration of the present disclosure is applied to the inner rotor type motor. However, this is only an example, and the configuration of the present disclosure may also be applied to an outer rotor type motor.

The preferred embodiments and modified preferred embodiments according to the present disclosure can be widely applied to a motor used for, for example, home appliances, vehicles, ships, airplanes, trains, industrial machines, robots, and the like.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor which is a three-phase motor, comprising:
   a stator including an annular shape around a central axis; and
   a rotor which is rotatable with respect to the stator; wherein
   the stator includes a stator core, which includes a plurality of teeth disposed to face the rotor and spaced by a distance from each other in a circumferential direction, and conductive wires wound around the plurality of teeth;
   a total number of slots positioned between the adjacent teeth in the circumferential direction is six or more;
   a ratio of a total number of poles of the rotor to the total number of the slots is 2:3;
   the conductive wires include conductive wires of three phases corresponding to a U-phase, a V-phase, and a W-phase;
   the conductive wires of the three phases are delta connected;
   a plurality of coils, in which any one of the conductive wires of the three phases is wound around the teeth, are repeatedly disposed in order of the U-phase, the V-phase, and the W-phase in the circumferential direction;
   in each of the U-phase, the V-phase, and the W-phase, at least two coils are connected in series and the coils connected in series are adjacent in the circumferential direction;
   a direction in which the U-phase and W-phase conductive wires are wound around the teeth and a direction in which the V-phase conductive wire is wound around the tooth are opposite; and
   ends of the conductive wires of the three phases are drawing lines withdrawn from one side in an axial direction.

2. The motor of claim 1, wherein the plurality of slots includes:
   a first slot from which the U-phase and V-phase drawing lines are withdrawn;
   a second slot from which the U-phase and W-phase drawing lines are withdrawn; and
   a third slot from which the V-phase and W-phase drawing lines are withdrawn.

3. The motor of claim 2, wherein
   in each of the U-phase, the V-phase and W-phase, the plurality of coils are connected in series;
   the total number of the slots is twelve or more; and
   the first slot, the second slot, and the third slot are disposed within about 180 degrees in the circumferential direction.

4. The motor of claim 2, wherein the first slot and the second slot, and the second slot and the third slot, are each disposed one slot apart in the circumferential direction.

5. The motor of claim 1, wherein
   the motor is an inner rotor motor in which the rotor is disposed inside the stator in a diameter direction;
   a busbar holder that supports a busbar is disposed at one side of the rotor in the axial direction;
   the busbar holder includes an opening that exposes a connecting portion of the busbar; and
   the drawing lines are connected to the connecting portion through the opening.

6. The motor of claim 1, wherein
   the motor is an inner rotor motor, in which the rotor is disposed inside the stator in the diameter direction, and includes a busbar connected to the drawing lines;
   the busbar includes a connecting portion connected to the drawing lines and an extension portion extending outward from the connecting portion in the diameter direction.

7. The motor of claim 6, wherein
   the busbar includes a first busbar, a second busbar, and a third busbar;
   the first busbar is located between the second busbar and the third busbar in the circumferential direction;
   the first busbar includes the connecting portion, the extension portion, and a first terminal portion extending outward from the extension portion in the diameter direction; and
   each of the second busbar and the third busbar includes the connecting portion, the extension portion, a relay portion extending from the extension portion in the circumferential direction, and a second terminal portion extending outward from the relay portion in the diameter direction.

8. The motor of claim 1, wherein
   an insulator is located between the teeth and the conductive wires; and
   the drawing lines are connected to a busbar protruding toward one side from the insulator in the axial direction.

9. The motor of claim 1, wherein
the total number of the slots is twelve or more; and
the U-phase, V-phase, and the W-phase conductive wires include a plurality of delta connected connecting bodies.

10. A motor comprising:
a stator including an annular shape around a central axis; and
a rotor which is rotatable with respect to the stator; wherein
the stator includes a stator core, which includes a plurality of teeth disposed to face the rotor and spaced by a distance from each other in a circumferential direction, and conductive wires wound around the plurality of teeth;
the conductive wires include conductive wires of three phases corresponding to a U-phase, a V-phase, and a W-phase;
the conductive wires of the three phases are delta connected;
a plurality of coils, in which any one of the conductive wires of the three phases is wound around the teeth, are repeatedly disposed in order of the U-phase, the V-phase, and the W-phase in the circumferential direction;
in each of the U-phase, the V-phase, and the W-phase, at least two coils are connected in series and the coils connected in series are adjacent in the circumferential direction;
a direction in which the U-phase and W-phase conductive wires are wound around the teeth and a direction in which the V-phase conductive wire is wound around the tooth are opposite; and
ends of the conductive wires of the three phases are drawing lines withdrawn from one side in an axial direction.

11. The motor of claim 10, wherein the plurality of slots includes:
a first slot from which the U-phase and V-phase drawing lines are withdrawn;
a second slot from which the U-phase and W-phase drawing lines are withdrawn; and
a third slot from which the V-phase and W-phase drawing lines are withdrawn.

12. The motor of claim 11, wherein
in each of the U-phase, the V-phase and W-phase, the plurality of coils are connected in series;
a total number of the slots is twelve or more; and
the first slot, the second slot, and the third slot are disposed within about 180 degrees in the circumferential direction.

13. The motor of claim 11, wherein the first slot and the second slot, and the second slot and the third slot, are each disposed one slot apart in the circumferential direction.

14. A stator comprising:
an annular shape around a central axis; and
a stator core, which includes an annular shape around a central axis, a plurality of teeth spaced by a distance from each other in a circumferential direction, and conductive wires wound around the plurality of teeth; wherein
the conductive wires include conductive wires of three phases corresponding to a U-phase, a V-phase, and a W-phase;
the conductive wires of the three phases are delta connected;
a plurality of coils, in which any one of the conductive wires of the three phases is wound around the teeth, are repeatedly disposed in order of the U-phase, the V-phase, and the W-phase in the circumferential direction;
in each of the U-phase, the V-phase, and the W-phase, at least two coils are connected in series and the coils connected in series are adjacent in the circumferential direction;
a direction in which the U-phase and W-phase conductive wires are wound around the teeth and a direction in which the V-phase conductive wire is wound around the tooth are opposite; and
ends of the conductive wires of the three phases are drawing lines withdrawn from one side in an axial direction.

15. The stator of claim 14, wherein
a plurality of slots are positioned between the adjacent teeth in the circumferential direction;
the plurality of slots includes:
a first slot from which the U-phase and V-phase drawing lines are withdrawn;
a second slot from which the U-phase and W-phase drawing lines are withdrawn; and
a third slot from which the V-phase and W-phase drawing lines are withdrawn.

16. The stator of claim 15, wherein
in each of the U-phase, the V-phase and W-phase, the plurality of coils are connected in series;
a total number of the slots is twelve or more; and
the first slot, the second slot, and the third slot are disposed within 180 degrees in the circumferential direction.

17. The stator of claim 15, wherein the first slot and the second slot, and the second slot and the third slot, are each disposed one slot apart in the circumferential direction.

18. A motor comprising:
the stator of claim 14; and
a rotor which is rotatable with respect to the stator.

19. The motor of claim 18 wherein a ratio of a total number of poles of the rotor to a total number of the slots is 2:3.

20. The motor of claim 18 wherein a total number of slots positioned between the adjacent teeth in the circumferential direction is six or more.

* * * * *